United States Patent [19]

Ishihara et al.

[11] 3,904,571

[45] Sept. 9, 1975

[54] RESIN COMPOSITION OF PROMINENT ADHESIVITY

[75] Inventors: Shigenobu Ishihara, Tokyo; Shoichi Kobayashi, Yokohama, both of Japan

[73] Assignee: Showa Denko Kabushiki Kaisha, Tokyo, Japan

[22] Filed: Apr. 22, 1974

[21] Appl. No.: 462,774

[30] Foreign Application Priority Data
Apr. 28, 1973 Japan.............................. 48-47362
Apr. 28, 1973 Japan.............................. 48-47363
May 8, 1973 Japan.............................. 48-50260

[52] U.S. Cl....... 260/31.2 R; 260/31.4 R; 260/31.6; 260/31.8 PQ; 260/31.8 W; 260/31.8 J
[51] Int. Cl.²...................... C08K 5/09; C08K 5/10
[58] Field of Search 260/31.2 R, 31.8 PQ, 31.8 PO, 260/878, 885, 31.4

[56] References Cited
UNITED STATES PATENTS
3,111,500  11/1963  Bartl et al....................... 260/878 X
3,661,696  5/1972  Knutson........................... 260/878 X

*Primary Examiner*—Lewis T. Jacobs
*Attorney, Agent, or Firm*—Kemon, Palmer & Estabrook

[57] ABSTRACT

A resin composition which comprises (A) 1 to 99 parts by weight of ethylene-vinyl acetate copolymer containing 5 to 50 parts by weight of vinyl acetate and (B) 99 to 1 part by weight of a mixture consisting of 1 to 99 mol % of unsaturated dicarboxylic anhydride and 99 to 1 mol % of esters of carboxylic acid and, if necessary, (C) 5.0 parts by weight at most of organic peroxide.

12 Claims, No Drawings

RESIN COMPOSITION OF PROMINENT ADHESIVITY

BACKGROUND OF THE INVENTION

This invention relates to a resin composition capable of firmly bonding various materials, particularly polyolefin moldings to each other, or said polyolefin moldings with other articles.

Polyolefins such as polyethylene and polypropylene have prominent resistance to a large variety of chemicals and are used in numerous molded forms in a wide field. However, said excellent chemical resistance presents considerable difficulties in effecting printing or dyeing on the surface of polyolefin moldings such as films, sheets and vessels, for example, bottles or bonding polyolefin moldings with other articles.

Therefore, to bond polyolefin moldings with other articles such as metals, wood, synthetic resin and glass, there have heretofore been proposed various processes such as the process of activating the surface of polyolefin moldings by subjecting the surface to ionization by γ-ray radiation, ozone oxidation or high temperature treatment (the Japanese Patent Application Publication No. 11,836/63), the process of subjecting polyethylene moldings to thermal degradation and later modifying it with maleic anhydride (the Japanese Patent Application Publication No. 8,728/69), the process of modifying polypropylene with maleic anhydride (the Japanese Patent Application Publication No. 10,757/67), the process of modifying liquid polymers of conjugated diolefin with maleic anhydride (the Japanese Patent Application Publication No. 21,109/64), the process of using a copolymer of ethylene and maleic anhydride or acrylic acid (the Japanese Patent Application Publication No. 23,341/63) and the process of using a graft copolymer (the Japanese Patent Application Publication No. 27,235/70).

These prior art processes indeed improved the adhesivity of polyolefin moldings to other articles to a certain extent. But said processes were accompanied with the drawbacks that polyolefin moldings could not be rendered fully adhesive: complicated operations were required; plant cost considerably increased; the shapes of articles which were to be bonded were limited; and reaction for preparing a bonding agent took a great deal of time.

The present inventors previously made various studies on the process of easily effecting firm bonding between polyolefin moldings and other articles. As the result, they found that polyolefin moldings could be very firmly bonded with other articles by mixing unsaturated carboxylic acid which is solid at room temperature and organic peroxide with ethylene-vinyl acetate copolymer or said copolymer blended with polyethylene, placing said mixture between the polyolefin moldings and other articles, and pressing all these superposed materials together under heat (refer to the Japanese Patent Application Disclosure No. 102139/73).

The above-mentioned process of bonding polyolefin moldings with other articles eliminates the necessity of using any separately prepared adhesive or previously activating polyolefin moldings by ionization, by γ-ray radiation, corona discharge, ozone oxidation or high temperature treatment.

The present inventors previously proposed a process of bonding polyolefin moldings with other articles by placing a mixture of unsaturated dicarboxylic anhydride and esters of unsaturated carboxylic acid or said mixture blended with alcoholic compounds between the polyolefin moldings and other articles and pressing all the superposed materials together under heat (refer to the Japanese Patent Application Disclosure No. 78243/73).

The present inventors previously proposed a process of bonding polyolefin moldings with other articles by placing a mixture consisting of esters prepared from polyhydric alcohols and acrylic acid or methacrylic acid which contain at least one hydroxyl group in the molecule, and unsaturated dicarboxylic anhydride between the polyolefin moldings and other articles and pressing all the superposed materials together under heat (refer to the Japanese Patent Application Disclosure No. 78244/73).

The present inventors previously proposed a process of bonding polyolefin moldings with other articles by placing a mixture consisting of unsaturated dicarboxylic anhydride, crotonic acid and diallyl phthalate between the polyolefin moldings and other articles and pressing all the superposed materials under heat (refer to the Japanese Patent Application Disclosure No. 78281/73).

However, the processes set forth in the Japanese Patent Application Disclosures Nos. 78243/73, 78244/73 and 78281/73 are found to have the drawbacks that though relatively firm bonding is attained by applying high temperature and long time in bonding operation, yet application of a temperature of 150°C or lower fails to provide firm bonding; application of rigorous bonding conditions involving high temperature and long time unavoidably deteriorates the quantity of bonded materials; and bonded mass prepared by these mixtures claimed in the above-mentioned Patent Application Disclosures is slightly weak against mechanical shocks and vibrations.

Further, the process disclosed in the Japanese Patent Application Disclosure No. 102139/73 is also found to be accompanied with the drawbacks that though above-mentioned mixture taking the form of films, sheets, or powders is very effective for bonding, said mixture in the liquid form presents difficulties in balancing the homogeneity and adhesivity of said mixture, because a common solvent to the constituents of said mixture is often unavailable.

SUMMARY OF THE INVENTION

It is accordingly the object of this invention to provide a resin composition capable of bonding moldings of various materials to each other or said moldings with other articles. A resin composition according to this invention developing prominent adhesivity characteristically comprises (A) 1 to 99 parts by weight of ethylene-vinyl acetate copolymer containing 5 to 50 % by weight of vinyl acetate, (B) 99 to 1 part by weight of a mixture consisting of 1 to 99 mol % of unsaturated dicarboxylic anhydride and 99 to 1 mol % of esters of carboxylic acid. Where required, it is possible to add 5.0 parts by weight at most of organic peroxide based on 100 parts by weight of the above-mentioned resin composition.

For the object of this invention, the mixture representing the component (B) may be replaced by mixture containing 2 mol at most of alcoholic compounds based on 1 mol of the unsaturated dicarboxylic anhydride.

Further, the unsaturated dicarboxylic anhydride included in the mixture of the component (B) may be replaced by unsaturated dicarboxylic anhydride containing crotonic acid.

The resin composition of this invention enables moldings of, for example, synthetic resins, rubber-like materials, metals and inorganic compounds, fibrous materials, paper and wood to be firmly bonded to each other or all these materials with other articles and renders a resultant bonded mass extremely stable to mechanical shocks and vibrations.

The resin composition of this invention is particularly adapted easily to bond polyolefin moldings of low adhesivity to each other or said moldings with other articles.

The resin composition of this invention most prominently displays its outstanding feature when used in the liquid form. This liquid composition has excellent transparency and homogeneity and develops a very high bonding strength even without adopting rigorous bonding conditions involving high temperature and long time.

DETAILED DESCRIPTION OF THE INVENTION

Ethylene-vinyl acetate copolymer used as the component (A) of the resin composition of this invention is a copolymer containing 5 to 50 % by weight of vinyl acetate. The copolymer is most preferred to contain 15 to 40 % by weight of vinyl acetate. A lower vinyl acetate content than 5 % by weight is undesirable due to the low adhesivity and solubility in organic solvents of a resultant resin composition. In contrast, a higher vinyl acetate content than 50 % by weight not only reduces the low temperature resistance, heat resistance, heat stability and water resistance of a resultant resin composition but also decreases bonding operation because, where the compositions are superposed in the form of films or sheets, the superposed films and sheets will be readily bonded to each other due to their great tackiness at room temperature.

Unsaturated dicarboxylic anhydride used as one ingredient of the mixture of the component (B) includes for example, maleic anhydride, itaconic anhydride, citraconic anhydride and α-methyl glutaconic anhydride. Esters of carboxylic acid forming the other ingredient of the mixture of the component (B) include acrylates, methacrylates, 2-methylene glutarates, itaconates and phthalates. Said acrylates and methacrylates include esters prepared from mono-or poly-hydric alcohols such as alkoxy monoalcohol, glycol, triol and tetraol and acrylic acid or methacrylic acid. Said esters include methoxy polyethylene glycol acrylate, methoxy polyethylene glycol methacrylate, ethoxy polyethylene glycol acrylate, ethoxy polyethylene glycol methacrylate, ethylene glycol diacrylate, ethylene glycol dimethacrylate, polyethylene glycol diacrylate, polyethylene glycol dimethacrylate, propylene glycol diacrylate, propylene glycol dimethacrylate, polypropylene glycol diacrylate, polypropylene glycol dimethacrylate, 1,3-butylene glycol diacrylate, 1,3-butylene glycol dimethacrylate, neopentyl glycol diacrylate, neopentyl glycol dimethacrylate, trimethylol ethane triacrylate, trimethylol ethane trimethacrylate, trimethylol propane triacrylate, trimethylol propane trimethacrylate and tetramethylol methane tetraacrylate. Among the esters listed above, methacrylates are preferred in view of the little odor evolved from such esters and substantially small harmful effect. There are also favorably accepted those esters prepared from polyhydric alcohols and acrylic acid or methacrylic acid which contain at least one hydroxyl group (—OH) in the molecule. Such preferred esters include hydroxyethyl methacrylate, hydroxyethyl acrylate, hydroxypropyl methacrylate, hydroxypropyl acrylate, polyethylene glycol monomethacrylate, polyethylene glycol monoacrylate, trimethylol ethane monomethacrylate, trimethylol ethane monoacrylate, trimethylol ethane dimethacrylate, trimethylol ethane diacrylate, tetramethylol methane diacrylate, tetramethylol methane triacrylate, pentaerythritol dimethacrylate, pentaerythritol diacrylate, pentaerythritol trimethacrylate and pentaerythritol triacrylate. It will be noted that alkyl acrylates and alkyl methacrylates containing alkyl groups such as methyl, ethyl, propyl and butyl are not disired in respect of odor.

The 2-methylene glutarates of the above-mentioned esters include alkyl or allyl-2-methylene glutarate expressed by the general formula:

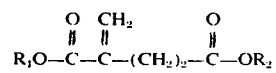

where $R_1$ and $R_2$ represent hydrogen, alkyl group or allyl group and either of $R_1$ and $R_2$ denotes the alkyl or allyl group. Said glutarates concretely include dimethyl-2-methylene glutarate, diethyl-2-metehylene glutarate, dibutyl-2-methylene glutarate, diallyl-2-methylene glutarate, monomethyl-2-methylene glutarate and monoethyl-2-methylene glutarate. The itaconates of the aforesaid esters include, for example, alkyl or allyl itaconate expressed by the general formula:

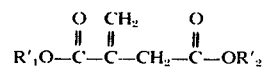

where $R'_1$ and $R'_2$ represent hydrogen, alkyl group or allyl group and either of $R'_1$ and $R'_2$ denotes the alkyl or allyl group. Said itaconates concretely include diethyl itaconate, dibutyl itaconate, monobutyl itaconate and methyl butyl itaconate.

The phthalates include alkyl allyl ester of phthalic acid or diallyl ester of phthalic acid expressed by the general formula:

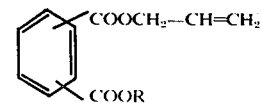

where R represents the alkyl or allyl group. Particularly preferred is diallyl phthalate.

The unsaturated dicarboxylic anhydride and esters of carboxylic acid are mixed in the ratio of 1 to 99 mol % for the anhydride and 99 to 1 mol % for the esters. A preferred ratio is 10 to 70 mol % of the anhydride and 90 to 30 mol % for the esters.

For the object of this invention, the mixture of the component (B) consisting of unsaturated dicarboxylic anhydride and esters of carboxylic acid may further be blended with alcoholic compounds. In this case, the proportion of alcoholic compounds is chosen to be 2 mol at most based on 1 mol of unsaturated dicarboxylic anhydride, or preferably 0.3 to 1.5 mol based on 1 mol of unsaturated dicarboxylic anhydride. A higher content of alcoholic compounds than 2 mol based on 1 mol of said anhydride fails to provide a resin composition of prominent adhesivity.

Alcoholic compounds include mono-or polyhydric alcohols such as octyl alcohol, cetyl alcohol, ethylene glycol, diethylene glycol, polyethylene glycol, propylene glycol, polypropylene glycol, glycerine and pentaerythritol. However, polyhydric alcohols are more preferred because adhesive compositions containing said alcohols give forth little odor in application. Further, those of the above-listed alcohols which have substituent groups including, for example, oxycarboxylic such as glyceric acid are also effective.

Where alkyl allyl ester of phthalic acid and diallyl ester of phthalic acid expressed by the general formula:

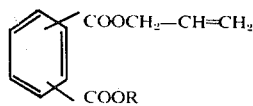

(where R is an alkyl radical or allyl radical.), particularly the diallyl phthalate, is used as aforesaid esters of carboxylic acid, the unsaturated dicarboxylic anhydride constituting the other ingredient of the mixture of the component (B) may further be blended with crotonic acid. In this case, the proportion of the crotonic acid is chosen to be 95 mol % at most, or particularly preferred to be 5 to 80 mol %. A larger crotonic acid content than 95 mol % fails to provide a resin composition of great adhesivity.

Ethylene-vinyl acetate copolymer forming the component (A) and the mixture constituting the component (B) are blended in the ratio of 1 to 99 parts by weight for the copolymer and 99 to 1 part by weight for the mixture of the component (B), or preferably 70 to 98 parts by weight for the copolymer and 30 to 2 parts by weight for the mixture of the component (B).

The object of this invention is well attained by a resin composition consisting of the component (A) (ethylene-vinyl acetate copolymer) and the component (B) (the above-mentioned mixture). However, addition of the component (C) (organic peroxide) enables the resultant resin composition to display a more prominent bonding force.

The organic peroxides used in this invention are of the type which is generally used as an initiator in radical polymerization and include dialkyl peroxide such as dicumyl peroxide: diacyl peroxide such as benzoyl peroxide; ketone peroxides such as methyl ethyl ketone peroxide and 1,1-bis-t-butyl peroxy-3,3,5-trimethyl-cyclohexane; hydroperoxides such as cumene hydroperoxide and 2,5-dimethyl hexane-2,5-dihydroperoxide; and peroxy esters such as t-butyl peroxybenzoate, t-butyl peroxyacetate and 2,5-dimethyl-2,5-dibenzoyl peroxyhexane. These organic peroxides may be used alone or in combination.

Most preferable are those organic peroxides which have a decomposition temperature (a 10-hour half life value) above 60°C.

The proportion of the above-mentioned organic peroxide is chosen to be 5.0 parts by weight at most based on 100 parts by weight of a composition consisting of the components (A) and (B), or preferably 0.1 to 3.0 parts by weight. A larger organic peroxide content than 5.0 parts by weight not only fails to elevate the adhesivity of a resultant resin composition but also decreases the uniformity of a bonding force. Moreover, where such large content of organic peroxide is mixed as the component (C) to the components (A) and (B), or during storage after mixing, then the crosslinking of the ethylenevinyl acetate copolymer is promoted by the action of said organic peroxide, rendering a resultant resin composition difficult to handle.

According to this invention, the component (A) (ethylenevinyl acetate copolymer) and the component (B) (the above-mentioned mixture which is a liquid having great fluidity) and, where required, the component (C) (organic peroxide) may be blended together by either of the following processes.

One of the mixing processes is to use such a mixer as a heated roll, Banbury mixer or extruder, where the component (A) (ethylene-vinyl acetate copolymer) has a relatively large proportion based on the component (B) (the above-mentioned mixture), thereby mixing both components (A) and (B) in a molten state. Or said mixing can be effected favorably using an organic solvent. Where a resin composition includes the component (C) (organic peroxide), high mixing temperature leads to the decomposition of the organic peroxide to give rise to the crosslinking of the ethylene-vinyl acetate copolymer, with the resultant occurrence of the drawbacks that not only the low wettability of the resin composition to the materials being bonded thereby reduces the adhesivity of said resin composition, but also the increased viscosity of said resin composition caused by the above-mentioned crosslinking sometimes obstructs stirring during the mixing operation. While, therefore, mixing is preferred to be carried out at as low a temperature as possible, the mixing temperature should be set as a practical guide at a lower level than that at which the half-value period of decomposition of the organic peroxide used amounts to 1 hour or preferably 10 hours. Namely, application of such a low temperature is intended to prevent the decomposition of the organic peroxide during mixing and attain said decomposition at the time of bonding.

Where the liquid mixture of the component (B) has a large proportion relative to the ethylene-vinyl acetate copolymer of the component (A), it is possible to dissolve or disperse the copolymer or said copolymer and organic peroxide in the liquid mixture, or to dissolve the copolymer (component A) and the mixture (component B) or these copolymer and mixture together with the organic peroxide in an organic solvent. This organic solvent includes n-hexane, cyclohexane, carbon tetrachloride, chloroform, benzene, toluene, xylene, methyl ethyl ketone and esters of acetic acid, for example, ethyl acetate. The ethylene-vinyl acetate copolymer (component A) and the mixture (component B) or these components together with the organic peroxide may be dissolved in any or combination of the above-listed organic solvents.

As mentioned above, the resin composition of this invention consists of the ethylene-vinyl acetate copolymer (component A) and the mixture (component B) or these components and organic peroxide.

However, depending on the object for which the subject resin composition is intended, it is possible to blend an additive, other synthetic resin or rubber-like material with said resin composition. All these blends should be construed to be included in the resin composition of this invention.

The additive usable in this invention includes a stabilizer to oxygen, ozone, light (ultraviolet ray) and heat, inhibitor of deterioration by metal (for example, copper inhibitor), flame retardant, workability promotor (for example, lubricant or plasticizer), reinforcing agent, filler, antistatic agent, anti-blocking agent, adhesivity promotor, and thickening agent.

The resin composition or blends thereof according to this invention displaying prominent adhesivity as previously described can be used as an adhesive for bonding between, for example, polyolefin moldings and other articles. Where no solvent is used, it is advised to place the resin composition or blend between the polyolefin moldings and other articles, and press the superposed mass together under heat. It is preferred to carry out said thermal pressing generally at a higher temperature than 100°C, though this temperature may practically vary with the kinds and proportions of the components (A), (B) and (C), and the proportions of the ingredients of the mixture (component B). Since, however, too high a pressing temperature gives rise to the noticeable deterioration of the ethylene-vinyl acetate copolymer and the rapid occurrence of its cross-linking, the preferred pressing temperature is a lower level than 22°C.

Bonding operation is desired to continue 1 to 10 minutes, though the time of said bonding operation may vary with the kinds and proportions of the subject resin composition or blends thereof and the bonding temperature applied, as well as with the kind and proportion of the organic peroxide, if it is added.

Though bonding may be effected simply by pressing the superposed mass together using, for example, an iron or a smoothing iron, a pressing machine such as a hot press or heated pressure roll can be conveniently used, because uniform pressure is applied.

Where adherends take the form of films, sheets or boards having a smooth surface, then it is possible to mold in advance the resin composition or blends thereof according to this invention into any of films and sheets and place the films and the sheets of the resin composition between the adherends, followed by thermal pressing.

Where the resin composition or blends thereof are used in a liquid or dispersed state, it is possible to coat or spray said resin composition or blends thereof on those surfaces of the adherends (for example, polyolefin moldings and other articles), or immerse one of said adherends in a solution or dispersion containing said resin compositions or blends thereof and, after evaporation of a solvent, superpose said one adherend thus treated on the other adherend, followed by thermal pressing.

In any of the above-mentioned cases, however, it is preferred that the resin composition or blends thereof according to this invention be applied on the object or objects of bonding uniformly in an amount of 0.0002 to 1 g/cm².

The resin composition or blends thereof according to this invention displaying prominent adhesivity can attain bonding between substantially all materials regardless of the forms taken thereby. The materials admitting of bonding by the resin composition of this invention includes metals such as aluminium, iron, copper, lead, chromium, zinc, tin, nickel and noble metals and alloys thereof (for example, brass, bronze, stainless steel and silver solder); thermoplastic resins such as polyethylene, polypropylene, polyvinyl chloride, polyacrylonitrile, acrylonitrile-butadiene-styrene resin (ABS resin), polystyrene, polymethyl methacrylate, acrylonitrilestyrene copolymer (AS resin), polyamide resin and polyester resin and blends thereof; thermosetting resins such as phenol resin, urea resin, melamine resin and unsaturated polyester resin; rubber-like materials such as polybutadiene rubber, styrene-butadiene rubber (SBR), acrylonitrile-butadiene rubber (NBR), ethylene-propylene rubber (EPR), ethylene-propylenediene terpolymer (EPT) and polychloroprene rubber; cellulosic materials such as wood, paper and cotton; and inorganic compounds such as glass, gypsum, cement and stones.

The resin composition and blends thereof according to this invention displaying prominent adhesivity as previously described can attain bonding between the above-listed materials regardless of the forms taken thereby. These forms include powders, films, sheets, foils, pipes, boards, rods, balls, fibers and woven fabrics.

This invention will be more fully understood by reference to the examples and controls which follow. Throughout the examples and controls, the bonding strength (peel strength) of samples was determined by peeling them through an angle of 180° at a tensile speed of 200 mm/min pursuant to ASTM D-903-49. The adhesive test under tension loading (shear strength) was tested pursuant to ASTM D-1002-53T.

EXAMPLE 1

There were dissolved in 1000 parts by weight of toluene 75 parts by weight of ethylene-vinyl acetate copolymer containing 30% by weight of vinyl acetate and having a density of 0.95 g/cc and a melt index of 20 g/10 min as measured at a temperature of 190°C. and under a load of 2.16 kg (manufactured by Sumitomo Chemical Co., Ltd. under a trade name "Evatate K 4010"); 25 parts by weight of ethylene-vinyl acetate copolymer containing 24% by weight of vinyl acetate and having a density of 0.95 g/cc and a melt index of 3 g/10 min (manufactured by Sumitomo Chemical Co., Ltd. under a trade name "Evatate K 2010"); 3.0 parts by weight of triethylene glycol dimethyacrylate; 1.0 part by weight of maleic anhydride; 0.4 part by weight of diethylene glycol; and 0.5 part by weight of dicumyl peroxide. The solution of the above-mentioned mixture was coated with a uniform thickness of about 0.05 mm on one side of two 0.1 mm thick aluminium foils degreased by trichloroethylene in advance, followed by drying for 2 hours at 60°C. A 1 mm thick sheet of high density polyethylene a density of 0.96 g/cc and a high load melt index of 0.6 g/10 min as measured under a load of 21.6 kg and at a temperature of 190°C (manufactured by Showa Yuka Co., Ltd. under a trade name "Sholex") was placed between the coated surfaces of said two aluminium foils. The superposed mass was hot pressed for 5 minutes at a temperature of 160°C and a pressure of 10 kg/cm² gauge using a hot press. The bonded mass thus obtained had a peel strength of 13.7 kg/2.5 cm width.

EXAMPLE 2

A solution was prepared from substantially the same mixture as in Example 1, excepting that the dicumyl peroxide used in Example 1 was omitted. The solution thus obtained was coated on one side of two aluminium foils and then dried in the same manner as in Example 1. The same high density polyethylene sheet as in Example 1 was placed between the coated surfaces of the two aluminium foils, followed by the same hot pressing as in Example 1. The bonded mass had a peel strength of 9.4 kg/ 2.5 cm width.

EXAMPLE 3

A solution was prepared from substantially the same mixture as in Example 1, excepting that the diethylene glycol used in Example 1 was not added. The solution thus obtained was coated on one side of two aluminium foils and then dried in the same manner as in Example 1. The same high density polyethylene sheet as in Example 1 was placed between the coated surfaces of the two aluminium foils, followed by the same hot pressing as in Example 1. The bonded mass had a peel strength of 9.8 kg/2.5 cm width.

EXAMPLE 4

A solution was prepared from substantially the same mixture as in Example 1, excepting that the diethylene glycol and dicumyl peroxide used in Example 1 were omitted. The solution thus formed was coated on one side of two aluminium foils and then dried in the same manner as in Example 1. The same high density polyethylene sheet as in Example 1 was placed between the coated surfaces of the two aluminium foils, followed by the same hot pressing as in Example 1. The bonded mass had a peel strength of 8.0 kg/2.5 cm width.

CONTROL 1

A solution was prepared from substantially the same mixture as in Example 1, excepting that the triethylene glycol dimethacrylate and diethylene glycol were omitted. The solution thus provided was coated on one side of two aluminium foils and then dried in the same manner as in Example 1. The same high density polyethylene sheet as in Example 1 was placed between the coated surfaces of the two aluminium foils, followed by the same hot pressing as in Example 1. The bonded mass had a peel strength of 4.9 kg/2.5 cm width.

CONTROL 2

A solution was prepared from substantially the same mixture as in Example 1, excepting that the maleic anhydride used in Example 1 was omitted. The solution thus prepared was coated on one side of two aluminium foils and then dried in the same manner as in Example 1. The same high density polyethylene sheet as in Example 1 was placed between the coated surfaces of the two aluminium foils, followed by the same hot pressing as in Example 1. The bonded mass had a peel strength of 4.2 kg/2.5 cm width.

CONTROL 3

A solution was prepared from substantially the same mixture as in Example 1, excepting that the maleic anhydride, diethylene glycol and dicumyl peroxide used in Example 1 were omitted. The solution thus formed was coated on one side of the two aluminium foils and then dried in the same manner as in Example 1. The same high density polyethylene sheet as in Example 1 was placed between the coated surfaces of the two aluminium foils, followed by the same hot pressing as in Example 1. The bonded mass had a peel strength of 3.2 kg/2.5 cm width.

CONTROL 4

A solution was prepared from substantially the same mixture as in Example 1, excepting that the triethylene glycol dimethacrylate, diethylene glycol and dicumyl peroxide were omitted. The solution thus prepared was coated on one side of the two aluminium foils and then dried in the same manner as in Example 1. The same high density polyethylene sheet as in Example 1 was placed between the coated surfaces of the two aluminium foils, followed by the same hot pressing as in Example 1. The bonded mass had a peel strength of 4.5 kg/2.5 cm width.

EXAMPLE 5

100 parts by weight of ethylene-vinyl acetate copolymer containing 30% by weight of vinyl acetate and having a density of 0.95 g/cc and a melt index of 20 g/10 min (manufactured by Sumitomo Chemical Co., Ltd. under a trade name "Evatate K 4010"); 5 parts by weight of diallyl phthalate; 2 parts by weight of itaconic anhydride; 0.8 part by weight of glycerin; and 1 part by weight of t-butyl-peroxybenzoate were dissolved in 1000 parts by weight of a mixed solvent consisting of 750 parts by weight of toluene and 250 parts by weight of ethyl acetate. The solution of the above-mentioned mixture was uniformly coated on one side of a 0.5 mm thick galvanized iron sheet degreased in advance by trichloroethylene as well as of a 0.1 mm thick aluminium foil. After the solution was air dried at room temperature, a 0.2 mm thick sheet of soft vinyl chloride resin having a polymerization degree of 1050 and containing 40 parts by weight of dioctyl phthalate as a plasticizer based on 100 parts by weight of the vinyl chloride resin (manufactured by Japan Zeon Company under a trade name "Zeon 103 EP") was placed between the coated surfaces of the galvanized iron sheet and aluminium foil. The superposed mass was hot pressed 1 minute at a temperature of 180°C and a pressure of 5 kg/cm$^2$ using a hot press. The bonded mass had a peel strength of 12.4 kg/2.5 cm width (the peel strength was determined by pulling off the aluminium foil).

EXAMPLES 6 to 8

Solutions were prepared from substantially the same mixture as in Example 1, excepting that the itaconic anhydride used in Example 5 was replaced by the same amount of the unsaturated dicarboxylic anhydrides shown in Table 1. The solutions thus prepared were uniformly coated on the same galvanized iron sheet and aluminium foil as in Example 5. After the solutions were air dried at room temperature, the same sheet of soft vinyl chloride resin as in Example 5 was placed between the coated surfaces of the galvanized iron sheet and aluminium foil, followed by the same hot pressing as in Example 5. The bonded masses had peel strengths set forth in Table 1 below.

Table 1

| Examples | Unsaturated dicarboxylic anhydride | Peel strength of bonded masses (kg/2.5 cm width) |
|---|---|---|
| 6 | α-methyl glutaconic anhydride | 11.9 |

Table 1-Continued

| Examples | Unsaturated dicarboxylic anhydride | Peel strength of bonded masses (kg/2.5 cm width) |
|---|---|---|
| 7 | Maleic anhydride | 13.2 |
| 8 | Citraconic anhydride | 10.5 |

EXAMPLES 9 to 17

Solutions were prepared from substantially the same mixture as in Example 1, excepting that the triethylene glycol dimethacrylate used in Example 1 was replaced by the same amount of the esters of carboxylic acid given in Table 2 below. The solutions thus prepared were uniformly coated on one side of the same two aluminium foils used in Example 1. The same high density polyethylene sheet as in Example 1 was placed between the coated surfaces of the respective aluminium foils, followed by the same hot pressing as in Example 1. The bonded masses had peel strengths set forth in Table 2 below.

Table 2

| Example | Esters of carboxylic acid | Peel strength of bonded masses (kg/2.5 cm width) |
|---|---|---|
| 9 | Methoxy polyethylene glycol acrylate | 10.6 |
| 10 | Propylene glycol dimethacrylate | 11.8 |
| 11 | Propylene glycol diacrylate | 11.2 |
| 12 | Polypropylene glycol diacrylate | 9.7 |
| 13 | Trimethylolethane triacrylate | 12.7 |
| 14 | Tetramethylolmethane tetra-acrylate | 11.6 |
| 15 | Dimethyl 2-methylene glutarate | 10.2 |
| 16 | Monoethyl 2-methylene glutarate | 9.6 |
| 17 | Diethyl itaconate | 12.0 |

EXAMPLES 18 to 23

Solutions were prepared from substantially the same mixture as in Example 1, excepting that the diethylene glycol used in Example 1 was replaced by the same amount of the alcoholic compounds indicated in Table 3 below. The solutions thus prepared were uniformly coated on one side of the same two aluminium foils used in Example 1. The same high density polyethylene sheet as in Example 1 was placed between the coated surfaces of the two aluminium foils, followed by the same hot pressing as in Example 1. The bonded masses had peel strengths shown in Table 3 below.

Table 3

| Example | Alcoholic compounds | Peel strength of bonded masses (kg/2.5 cm width) |
|---|---|---|
| 18 | Octyl alcohol | 12.2 |
| 19 | Ethylene glycol | 13.1 |
| 20 | Triethylene glycol | 13.6 |
| 21 | Propylene glycol | 13.0 |
| 22 | Glycerin | 13.5 |
| 23 | Pentaerythritol | 11.4 |

EXAMPLE 24

A solution was prepared from substantially the same mixture as in Example 1, excepting that the amounts of the triethylene glycol dimethacrylate and maleic anhydride were changed to 5.0 parts by weight and 0.5 part by weight respectively. The solution thus prepared was uniformly coated on one side of the same two aluminium foils used in Example 1. The same high density polyethylene sheet as in Example 1 was placed between the coated surfaces of the two aluminium foils, followed by the same hot pressing as in Example 1. The bonded mass had a peel strength of 12.4 kg/2.5 cm width.

EXAMPLE 25

A solution was prepared from substantially the same mixture as in Example 1, excepting that the amounts of the triethylene glycol dimethacrylate and maleic anhydride were changed to 2.0 and 3.0 parts by weight respectively. The solution thus prepared was uniformly coated on one side of the same two aluminium foils used in Examle 1. The same high density polyethylene sheet was placed between the coated surfaces of the two aluminium foils, followed by the same hot pressing as in Example 1. The bonded mass had a peel strength of 13.2 kg/2.5 cm width.

EXAMPLE 26

A solution was prepared from substantially the same mixture as in Example 1, excepting that triethylene glycol dimethacrylate, maleic anhydride and diethylene glycol mixed in the same proportions as in Example 1 were used in a total amount of 1.0 part by weight. The solution thus prepared was uniformly coated on one side of the same two aluminium foils used in Example 1. The same high density polyethylene sheet as in Example 1 was placed between the coated surfaces of the two aluminium foils, followed by the same hot pressing as in Example 1. The bonded mass had a peel strength of 11.0 kg/2.5 cm width.

EXAMPLE 27

A solution was prepared from substantially the same mixture as in Example 1, excepting that triethylene glycol dimethacrylate, maleic anhydride and diethylene glycol mixed in the same proportions as in Example 1 were used in a total amount of 10 parts by weight. The solution thus prepared was uniformly coated on one side of the same two aluminium foils used in Example 1. The same high density polyethylene sheet as in Example 1 was placed between the coated surfaces of the two aluminium foils, followed by the same hot pressing as in Example 1. The bonded mass had a peel strength of 14.0 kg/2.5 cm width.

EXAMPLE 28

A solution was prepared from substantially the same mixture as in Example 1, excepting that triethylene glycol dimethacrylate, maleic anhydride and diethylene glycol mixed in the same proportions as in Example 1 were used in a total amount of 30 parts by weight. The solution thus prepared was uniformly coated on one side of the same two aluminium foils used in Example 1. The same high density polyethylene sheet as in Example 1 was placed between the coated surfaces of the two aluminium foils, followed by the same hot pressing as in Example 1. The bonded mass had a peel strength of 12.8 kg/2.5 cm width.

EXAMPLE 29

A solution was prepared from substantially the same mixture as in Example 1, excepting that the two kinds of ethylene-vinyl acetate copolymer used in Example 1 were replaced by 100 parts by weight of another kind of ethylene-vinyl acetate copolymer containing 14% by weight of vinyl acetate and having a density of 0.93 g/cc and a melt index of 15 g/10 min (manufactured by Mitsui Polychemical Co., Ltd. under a trade name "Evaflex No. 550"). The solution thus prepared was uniformly coated on one side of the same two aluminum foils used in Example 1. The same high density polyethylene sheet as in Example 1 was placed between the coated surfaces of the two aluminium foils, followed by the same hot pressing as in Example 1. The bonded mass had a peel strength of 10.9 kg/2.5 cm width.

EXAMPLE 30

A solution was prepared from substantially the same mixture as in Example 1, excepting that the two kinds of ethylene-vinyl acetate copolymer used in Example 1 were replaced by 100 parts by weight of another kind of ethylene-vinyl acetate copolymer containing 20 % by weight of vinyl acetate and having a density of 0.94 g/cc and a melt index of 20 g/10 min (manufactured by Toyo Soda Mfg. Co., under a trade name "Ultrathene UE 633"). The solution thus prepared was uniformly coated on one side of the same two aluminium foils used in Example 1. The same high density polyethylene sheet as in Example 1 was placed between the coated surface of the two aluminium foils, followed by the same hot pressing as in Example 1. The bonded mass had a peel strength of 12.3 kg/2.5 cm width.

EXAMPLE 31

A solution was prepared from substantially the same mixture as in Example 1, excepting that the two kinds of ethylenevinyl acetate copolymer used in Example 1 were replaced by 100 parts by weight of another kind of ethylene-vinyl acetate copolymer containing 45 % by weight of vinyl acetate (manufactured by Bayer AG. under a trade name "Levaprene 450"). The solution thus prepared was uniformly coated on one side of the same two aluminium foils used in Example 1. The same high density polyethylene sheet as in Example 1 was placed between the coated surfaces of the two aluminium foils, followed by the same hot pressing as in Example 1. The bonded mass had a peel strength of 10.8 kg/2.5 cm width.

EXAMPLES 32 to 34

Solutions were prepared from substantially the same mixture as in Example 1, excepting that the dicumyl peroxide used in Example 1 was replaced by the organic peroxides shown in Table 4 below. The solutions thus prepared were uniformly coated on one side of the same two aluminium foils used in Example 1. The same high density polyethylene sheet as in Example 1 was placed between the coated surfaces of the respective aluminium foils, followed by the same hot pressing as in Example 1. The bonded masses had peel strengths given in Table 4 below.

Table 4

| Example | Organic peroxides | Peel strength of bonded masses (kg/2.5 cm width) |
| --- | --- | --- |
| 32 | 1,1-bis-tert-butylperoxy-3,3,5-trimethyl cyclohexane | 10.9 |
| 33 | Benzoyl peroxide | 11.5 |
| 34 | 2,5-dimethyl-2,5-dibenzoyl peroxyhexane | 11.2 |

EXAMPLE 35

The solution of the mixture used in Example 1 was uniformly coated on one side of the two aluminium foils in the same manner as in Example 1. A 1 mm thick sheet of phenol resin was placed between the coated surfaces of the two aluminium foils, followed by the same hot pressing as in Example 1. The bonded mass had a peel strength of 14.5 kg/2.5 cm width.

EXAMPLE 36

100 parts by weight of the ethylene-vinyl acetate copolymer used in Example 30, 3 parts by weight of dimethyl-2-methylene glutarate, 5 parts by weight of citraconic anhydride, 1 part by weight of glyceric acid and 1 part by weight of dicumyl peroxide were dissolved in 1000 parts by weight of xylene at 50°C. The solution thus prepared was uniformly coated on one side of the two aluminium foils in the same manner as in Example 1. After the solution was dried 5 minutes at 160°C, a 5 mm thick piece of wood (cedar) was placed between the coated surfaces of the two aluminium foils, followed by hot pressing for 10 minutes at a temperature of 130°C and pressure of 5 kg/cm², using a hot press. The bonded mass had a peel strength of 8.3 kg/2.5 cm width.

EXAMPLE 37

The solution of the mixture used in Example 1 was uniformly coated on one side of the two aluminium foils in the same manner as in Example 1. A 1 mm thick sheet of kraft paper was placed between the coated surfaces of the two aluminium foils, followed by the same hot pressing as in Example 36. Though it was tried to measure the peel strength of the bonded mass, the kraft paper was torn due to its very firm bonding with the aluminium foils, failing to indicate the exact peel strength of said mass.

EXAMPLE 38

A solution was prepared from 5 parts by weight of ethylene-vinyl acetate copolymer containing 28 % by weight of vinyl acetate and having a density of 0.95 g/cc and a melt index of 150 g/10 min (manufactured by Mitsui Polychemical Co., Ltd. under a trade name "Evaflex No. 220"), 70 parts by weight of trimethylolethane triacrylate, 30 parts by weight of maleic anhydride, 5 parts by weight of ethylene glycol and 1 part by weight of dicumyl peroxide. The solution thus prepared was uniformly coated on one side of a 1 mm thick copper plate with a uniform thickness of 0.05 mm. Another copper plate was placed on the coated surface of the first mentioned copper plate, followed by hot pressing at a temperature of 180°C and pressure of 10 kg/cm², using a hot press. The bonded mass had a shear strength of 150 kg/cm².

EXAMPLE 39

The same kind of solution as in Example 38 was uniformly coated on one side of a 0.5 mm thick plate of stainless steel (SUS 27). Another stainless steel plate was placed on the coated surface of the first mentioned stainless steel plate, followed by the same hot pressing as in Example 38. The bonded mass had a shear strength of 140 kg/cm$^2$.

EXAMPLE 40

100 parts by weight of ethylene-vinyl acetate copolymer containing 24 % by weight of vinyl acetate and having a density of 0.95 g/cc and melt index of 3.0 g/10 min (manufactured by Sumitomo Chemical Co., Ltd. under a trade name "Evatate K 2010"), 4.5 parts by weight of hydroxyethyl methacrylate, 2.0 parts by weight of maleic anhydride (said methacrylate bearing a molar ratio of 1:0.59 to said maleic anhydride), and 0.5 part by weight of dicumyl peroxide were dissolved in about 1000 parts by weight of toluene. The solution of the above-mentioned mixture was uniformly coated on one side of the two aluminium foils and then dried in the same manner as in Example 1. The same high density polyethylene sheet as in Example 1 was placed between the coated surfaces of the two aluminium foils, followed by the same hot pressing as in Example 1. The bonded mams had a peel strength of 14.3 kg/2.5 cm width.

EXAMPLE 41

A solution was prepared from substantially the same mixture as in Example 40, excepting that the dicumyl peroxide used in Example 40 was omitted. The solution thus prepared was uniformly coated on one side of the two aluminium foils and then dried in the same manner as in Example 1. The same high density polyethylene sheet as in Example 1 was placed between the coated surfaces of the two aluminium foils, followed by the same hot pressing as in Example 1. The bonded mass had a peel strength of 9.5 kg/2.5 cm width.

EXAMPLE 42

100 parts by weight of ethylene-vinyl acetate copolymer containing 33 % by weight of vinyl acetate and having a density of 0.95 g/cc and melt insex of 25 g/10 min (manufactured by Mitsui Polychemical Co., Ltd. under a trade name "Evaflex 150"), 3.0 parts by weight of hydroxyethyl methacrylate, 2.0 parts by weight of itaconic anhydride and 1.0 parts by weight of dicumyl peroxide were dissolved in about 1000 parts by weight of a solvent consisting of about 800 parts by weight of toluene and about 200 parts by weight of ethyl acetate. The solution was uniformly coated on one side of a 1 mm thick iron plate having its surface degreased in advance by trichloroethylene and also on one side of an aluminium foil used in Example 1. After the solution was air dried overnight, a 0.5 mm thick sheeet of soft vinyl chloride resin having an average polymerization degree of about 1000 and containing 50 parts by weight of dioctyl phthalate as a plasticizer based on 100 parts by weight of the vinyl chloride resin (manufactured by Japan Zeon Company under a trade name "Zeon 103 EP-J") was placed between the coated surfaces of the iron plate and the aluminium foil, followed by the same hot pressing as in Example 1. The bonded mass had a peel strength of 10.5 kg/2.5 cm width.

EXAMPLE 43

The same kind of solution as in Example 42 was uniformly coated on one side of a 5 mm thick piece of wood (cedar). After the solution was air dried overnight, the aluminium foil of the same form as in Example 1 was placed on the coated surface of the wooden piece, followed by hot pressing for 5 minutes at a temperature of 130°C and pressure of 10 kg/cm$^2$ gauge, using a hot press. The bonded mass had a peel strength of 8.7 kg/2.5 cm width.

EXAMPLE 44

The same kind of solution as in Example 40 was uniformly coated on one side of the two aluminium foils and then dried in the same manner as in Example 1. A 1 mm thick sheet of phenolic resin was placed between the coated surfaces of the two aluminium foils, followed by the same hot pressing as in Example 1. The bonded mass had a peel strength of 15.2 kg/2.5 cm width.

EXAMPLES 45 and 46

Solutions were prepared from substantially the same mixture as in Example 40, excepting that the maleic anhydride used in Example 40 was replaced by the same amount of citraconic anhydride (Example 45) and α-methyl gluctaconic anhydride (Example 46). The respective solutions thus prepared were uniformly coated on one side of the two aluminium foils and then dried in the same manner as in Example 1. The same high density polyethylene sheet as in Example 1 was placed between the coated surfaces of the two aluminium foils, followed by the same hot pressing as in Example 1. The bonded masses had a peel strength of 12.9 kg/2.5 cm width (example 45) and a peel strength of 13.1 kg/2.5 cm width (Example 46) respectively.

EXAMPLES 47 to 52

Solutions were prepared from substantially the same mixture as in Example 40, excepting that the hydroxyethyl methacrylate used in Example 40 was replaced by the same amount of esters of carboxylic acid listed in Table 5 below. The solutions thus prepared were uniformly coated on one side of the two aluminium foils and then dried in the same manner as in Example 1. The same high density polyethylene sheet as in Example 1 was placed between the coated surfaces of the two aluminium foils, followed by the same hot pressing as in Example 1. The bonded masses had peel strengths shown in Table 5 below.

Table 5

| Example | Esters of carboxylic acid | Peel strength of bonded masses (kg/2.5 cm width) |
|---|---|---|
| 47 | Triethylene glycol monoacrylate | 13.9 |
| 48 | Trimethylolethane diacrylate | 13.1 |
| 49 | Hydroxypropyl methacrylate | 12.5 |
| 50 | Hydroxypropyl acrylate | 11.8 |
| 51 | Pentaerythritol dimethacrylate | 13.3 |
| 52 | Pentaerythritol diacrylate | 12.7 |

EXAMPLES 53 and 54

Solutions were prepared from substantially the same mixture as in Example 40, excepting that the ethylenevinyl acetate copolymer used in Example 40 was replaced in Example 53 by another kind of ethylene-vinyl acetate polymer containing 14 % by weight of the vinyl acetate used in Example 29 and in Example 54 by still another kind of ethylene-vinyl acetate copolymer containing 45 % by weight of the vinyl acetate used in Example 31. The respective solutions thus prepared were uniformly coated on one side of the two aluminium foils and then dried in the same manner as in Example 1. The same high density polyethylene sheet as in Example 1 was placed between the coated surfaces of the two aluminium foils, followed by the same hot pressing as in Example 1. The bonded masses had a peel strength of 10.3 kg/2.5 cm width (Example 53) and a peel strength of 9.7 kg/2.5 cm width (Example 54) respectively.

CONTROL 5

A solution was prepared from substantially the same mixture as in Example 40, excepting that the ethylene-vinyl acetate copolymer used in Example 40 was omitted. The solution thus prepared was uniformly coated on one side of the two aluminium foils and then dried in the same manner as in Example 1. The same high density polyethylene sheet as in Example 1 was placed between the coated surfaces of the two aluminium foils, followed by the same hot pressing as in Example 1. The bonded mass had a peel strength of 1.0 to 6.9 kg/2.5 cm width.

CONTROL 6

A solution was prepared for substantially the same mixture as in Example 40, excepting that the ethylene-vinyl acetate copolymer used in Example 40 was replaced by another kind of ethylene-vinyl acetate copolymer containing 60 % by weight of vinyl acetate. The solution thus prepared was uniformly coated on one side of the two aluminum foils and then dried in the same manner as in Example 1. The coated surface presented a very sticky state. The same high density polyethylene sheet as in Example 1 was placed between the coated surfaces of the two aluminium foils, followed by the same hot pressing as in Example 1. The bonded mass had a peel strength of 5.1 kg/2.5 cm width.

EXAMPLE 55

A solution was prepared from substantially the same mixture as in Example 40, excepting that the amounts of the hydroxyethyl methacrylate and maleic anhydride used in Example 40 were changed to 2.0 and 3.0 parts by weight respectively. The solution thus prepared was uniformly coated on one side of the two aluminium foils and then dried in the same manner as in Example 1. The same high density polyethylene sheet as in Example 1 was placed between the coated surfaces of the two aluminium foils, followed by the same hot pressing as in Example 1. The bonded mass had a peel strength of 13.3 kg/2.5 cm width.

EXAMPLE 56

A solution was prepared from substantially the same mixture as in Example 40, excepting that the amount of the hydroxyethyl methacrylate and maleic anhydride used in Example 40 were changed to 10.0 parts by weight and 2.0 parts by weight respectively. The solution thus prepared was uniformly coated on one side of the two aluminium foils and then dried in the same manner as in Example 1. The same high density polyethylene sheet as in Example 1 was placed between the coated surfaces of the two aluminium foils, followed by the same hot pressing as in Example 1. The bonded mass had a peel strength of 13.2 kg/2.5 cm width.

CONTROL 7

A solution was prepared from substantially the same mixture as in Example 40, excepting that the hydroxyethyl methacrylate used in Example 40 was omitted and the amounts of the maleic anhydride used in said Example 40 was changed to 3.0 parts by weight. The solution thus prepared was uniformly coated on the one side of the two aluminium foils and then dried in the same manner as in Example 1. The sme high density polyethylene sheet was placed between the coated surfaces of the two aluminium foils, followed by the same hot pressing as in Example 1. The bonded mass had a peel strength of 6.1 kg/2.5 cm width.

CONTROL 8

A solution was prepared from substantially the same mixture as in Example 40, excepting that the maleic anhydride used in Example 40 was omitted and the amount of the hydroxyethyl methacrylate used in said Example 40 was changed to 5.0 parts by weight. The solution thus prepared was uniformly coated on one side of the two aluminium foils and then dried in the same manner as in Example 1. The same high density polyethylene sheet was placed between the coated surfaces of the two aluminium foils, followed by the same hot pressing as in Example 1. The bonded mass had a peel strength of 4.8 kg/2.5 cm width.

EXAMPLE 57

A solution was prepared from substantially the same mixture as in Example 40, excepting that the hydroxyethyl methacrylate and maleic anhydride mixed in the same proportions as in Example 40 were used in a total amount of 1.0 part by weight. The solution thus prepared was uniformly coated on one side of the two aluminium foils and then dried in the same manner as in Example 1. The same high density polyethylene sheet as in Example 1 was placed between the coated surfaces of the two aluminium foils, followed by the same hot pressing as in Example 1. The bonded mass had a peel strength of 11.2 kg/2.5 cm width.

EXAMPLE 58

A solution was prepared from substantially the same mixture as in Example 40, excepting that the hydroxyethyl methacrylate and maleic anhydride mixed in the same proportions as in Example 40 were used in a total amount of 10.0 parts by weight. The solution thus prepared was uniformly coated on one side of the two aluminium foils and then dried in the same manner as in Example 1. The same high density polyethylene sheet was placed between the coated surfaces of the two aluminium foils, followed by the same hot pressing as in Example 1. The bonded mass had a peel strength of 14.8 kg/2.5 cm width.

EXAMPLE 59

A solution was prepared from substantially the same mixture as in Example 40, excepting that the hydroxyethyl methacrylate and maleic anhydride mixed in the same proportions as in Example 40 were used in a total amount of 30.0 parts by weight. The solution thus prepared was uniformly coated on one side of the two aluminium foils and then dried in the same manner as in Example 1. The same high density polyethylene sheet as in Example 1 was placed between the coated surfaces of the two aluminium foils, followed by the same hot pressing as in Example 1. The bonded mass had a peel strength of 13.1 kg/2.5 cm width.

CONTROL 9

A solution was prepared from substantially the same mixture as in Example 40, excepting that the hydroxyethyl methacrylate and maleic anhydride used in Example 40 were omitted. The solution thus prepared was uniformly coated on one side of the two aluminium foils and then dried in the same manner as in Example 1. The same high density polyethylene sheet as in Example 1 was placed between the coated surfaces of the two aluminium foils, followed by the same hot pressing as in Example 1. The bonded mass had a peel strength of 3.8 kg/2.5 cm width.

EXAMPLES 60 to 63

Solutions were prepared from substantially the same mixture as in Example 40, excepting that the dicumyl peroxide used in Example 40 was replaced by the organic peroxides shown in Table 6 below. The solutions thus prepared were uniformly coated on one side of the two aluminium foils and then dried in the same manner as in Example 1. The same high density polyethylene sheet as in Example 1 was placed between the coated surfaces of the two aluminium foils, followed by the same hot pressing as in Example 1. The bonded masses had peel strengths set forth in Table 6 below.

Table 6

| Example | Organic peroxides | Peel strength of bonded masses (kg/2.5 cm width) |
|---|---|---|
| 60 | 1,1-bis-tert-butyl-peroxy-3,3,5-trimethyl cyclohexane | 11.4 |
| 61 | 2,5-dimethyl hexane-2,5-dihydroperoxide | 9.8 |
| 62 | Benzoyl peroxide | 12.0 |
| 63 | 2,5-dimethyl-2,5-dibenzoyl peroxyhexane | 11.5 |

EXAMPLE 64

75 parts by weight of ethylene-vinyl acetate copolymer containing 30% by weight of vinyl acetate and having a density of 0.95 g/cc and a melt index of 20 g/10 min (manufactured by Sumitomo Chemical Co., Ltd. under a trade name "Evatate K 4010"), 25 parts by weight of another kind of ethylene-vinyl acetate copolymer containing 20% by weight of vinyl acetate and having a density of 0.94 g/cc and a melt index of 20 g/10 min (manufactured by Toyo Soda Mfg. Co. under a trade name "Ultrathene UE 633"), 10 parts by weight of hydroxy propyl methacrylate, 5 parts by weight of citraconic anhydride, and 0.5 part by weight of tert-butyl-peroxybenzoate were dissolved in 1000 parts by weight of toluene. The solution thus prepared was uniformly coated on one side of a 1 mm thick copper plate having its surface degreased in advance by trichloroethylene and then dried for 2 hours at a temperature of 50°C. Another copper plate was placed on the coated surface of the first mentioned copper plate, followed by hot pressing at a temperature of 180°C and pressure of 20 kg/cm² gauge, using a hot press. The bonded mass had a shear strength of 84 kg/cm².

EXAMPLE 65

A solution was prepared from substantially the same mixture as in Example 64, excepting that the citraconic anhydride used in Example 64 was replaced by the same amount of α-methyl glutaconic anhydride. The solution thus prepared was uniformly coated on one side of a 2 mm thick lead plate having its surface degreased in advance by trichloroethylene. After the solution was dried in the same manner as in Example 1, another lead plate was placed on the coated surface of the first mentioned lead plate. Though it was tried to determine the shear strength of the bonded mass, the lead plates were torn due to their firm mutual bonding.

EXAMPLE 66

The solution of the mixture of Example 40 was uniformly coated on one side of the two aluminium foils used in Example 1. A sheet of kraft paper was placed between the coated surfaces of the two aluminium foils, followed by the same hot pressing as in Example 1. Though it was tried to determine the peel strength of the bonded mass, the kraft paper was torn due to its firm bonding to the aluminium foils.

EXAMPLE 67

A solution was prepared from a mixture of 10 parts by weight of the ethylene-vinyl acetate copolymer of Example 38 containing 28 % by weight of vinyl acetate, 76 parts by weight of hydroxyethyl methacrylate, 30 parts by weight of maleic anhydride and 1.0 part by weight of dicumyl peroxide. The solution thus prepared was uniformly coated on one side of the two aluminium foils used in Example 1. The same high density polyethylene sheet as in Example 1 was placed between the coated surfaces of the two aluminium foils, followed by hot pressing for 1 minute at a temperature of 180°C and pressure of 5 kg/cm² gauge, using a hot press. The bonded mass had a peel strength of 13.5 kg/2.5 cm width.

EXAMPLE 68

75 parts by weight of the ethylene-vinyl acetate copolymer of Example 1 containing 30 % by weight of vinyl acetate, 25 parts by weight of the ethylene-vinyl acetate copolymer of Example 1 containing 24 % by weight of vinyl acetate, 3 parts by weight of diallyl phthalate, 0.7 part by weight of maleic anhydride, 0.4 part by weight of crotonic acid and 0.5 part by weight of dicumyl peroxide were dissolved in about 1000 parts by weight of toluene. The solution thus prepared was uniformly coated on one side of the two aluminium foils and then dried in the same manner as in Example 1. The same high density polyethylene sheet as in Example 1 was placed between the coated surfaces of the two aluminium foils, followed by the same hot pressing as in Example 1. The bonded mass had a peel strength of 13.9 kg/2.5 cm width.

EXAMPLE 69

The solution of the mixture of Example 68 was uniformly coated on one side of a 0.1 mm thick aluminium foil. After the solution was air dried overnight, a 5 mm thick board of wood (cedar) was placed on the coated surface of the aluminium foil, followed by hot pressing for 5 minutes at a temperature of 130°C and pressure of 10 kg/cm² gauge, using a hot press. The bonded mass had a peel strength of 9.0 kg/2.5 cm width.

EXAMPLE 70

The solution of the mixture of Example 68 was uniformly coated on one side of an aluminium foil of the same form as in Example 1. After the solution was dried in the same manner as in Example 1, a mm thick sheet of phenolic resin was placed on the coated surface of the aluminium foil, followed by the same hot pressing as in Example 69. The bonded mass had a peel strength of 12.6 kg/2.5 cm width.

EXAMPLE 71

A solution was prepared from substantially the same mixture as in Example 68, excepting that the dicumyl peroxide used in Example 68 was omitted. The solution thus prepared was uniformly coated on one side of the two aluminium foils and then dried in the same manner as in Example 1. The same high density polyethylene sheet as in Example 1 was placed between the coated surfaces of the two aluminium foils, followed by the same hot pressing as in Example 1. The bonded mass had a peel strength of 11.5 kg/2.5 cm width.

EXAMPLES 72 to 74

Solutions were prepared from substantially the same mixture as in Example 68, excepting that the maleic anhydride used in Example 68 was replaced by the same amount of the unsaturated dicarboxylic anhydride shown in Table 7 below. The solutions thus prepared were uniformly coated on one side of the two aluminium foils and then dried in the same manner as in Example 1. The same high density polyethylene sheet as in Example 1 was placed between the coated surfaces of the respective aluminium foils, followed by the same hot pressing as in Example 1. The bonded masses had peel strengths set forth in Table 7 below.

Table 7

| Example | Unsaturated dicarboxylic anhydride | Peel strength of bonded masses (kg/2.5 cm width) |
|---|---|---|
| 72 | α-methyl glutaconic anhydride | 10.7 |
| 73 | Citraconic anhydride | 11.3 |
| 74 | Itaconic anhydride | 12.5 |

EXAMPLE 75

A solution was prepared from substantially the same mixture as in Example 68, excepting that the amounts of maleic anhydride and diallyl phthalate used in Example 68 were changed to 3.0 and 1.0 parts by weight respectively. The solution thus prepared was uniformly coated on one side of the two aluminium foils and then dried in the same manner as in Example 1. The same high density polyethylene sheet as in Example 1 was placed between the coated surfaces of the two aluminium foils, followed by the same hot pressing as in Example 1. The bonded mass had a peel strength of 12.7 kg/2.5 cm width.

EXAMPLE 76

A solution was prepared from substantially the same mixture as in Example 68, excepting that the amounts of maleic anhydride and diallyl phthalate used in Example 68 were changed to 1.0 and 5.0 parts by weight respectively. The solution thus prepared was uniformly coated on one side of the two aluminium foils and then dried in the same manner as in Example 1. The same high density polyethylene sheet as in Example 1 was placed between the coated surfaces of the two aluminium foils, followed by the same hot pressing as in Example 1. The bonded mass had a peel strength of 10.3 kg/2.5 cm width.

EXAMPLE 77

A solution was prepared from substantially the same mixture as in Example 68, excepting that the amounts of maleic anhydride and crotonic acid used in Example 68 were changed to 2.0 and 0.2 parts by weight respectively. The solution thus prepared was uniformly coated on one side of the two aluminium foils and then dried in the same manner as in Example 1. The same high density polyethylene sheet as in Example 1 was placed between the coated surfaces of the two aluminium foils, followed by the same hot pressing as in Example 1. The bonded mass had a peel strength of 12.2 kg/2.5 cm width.

EXAMPLE 78

A solution was prepared from substantially the same mixture as in Example 68, excepting that the amounts of maleic anhydride and crotonic acid used in Example 68 were changed to 0.5 and 1.0 parts by weight respectively. The solution thus prepared was uniformly coated on one side of the two aluminium foils and then dried in the same manner as in Example 1. The same high density polyethylene sheet as in Example 1 was placed between the coated surfaces of the two aluminium foils, followed by the same hot pressing as in Example 1. The bonded mass had a peel strength of 10.5 kg/2.5 cm width.

EXAMPLES 79 to 81

Solutions were prepared from substantially the same mixture as in Example 68, excepting that the ethylene-vinyl acetate copolymer used in Example 68 was replaced by several other kinds of said copolymer listed in Table 8 below. The solutions thus prepared were uniformly coated on one side of the two aluminium foils and then dried in the same manner as in Example 1.

The same high density polyethylene sheet as in Example 1 was placed between the coated surfaces of the respective aluminium foils, followed by the same hot pressing as in Example 1. The bonded masses had peel strengths given in Table 8 below.

Table 8

| Example | Ethylene-vinyl acetate copolymers | Peel strength of bonded masses (kg/ 2.5 cm width) |
| --- | --- | --- |
| 79 | Ethylene-vinyl acetate copolymer of Example 29 containing 14% by weight of vinyl acetate | 9.4 |
| 80 | Ethylene-vinyl acetate copolymer of Example 30 containing 20% by weight of vinyl acetate | 10.1 |
| 81 | Ethylene-vinyl acetate copolymer of Example 31 containing 45% by weight of vinyl acetate | 9.2 |

EXAMPLE 82

A solution was prepared from substantially the same mixture as in Example 68, excepting that maleic anhydride, crotonic acid and diallyl phthalate mixed in the same proportions as in Example 68 had a total amount of 1.0 part by weight. The solution thus prepared was uniformly coated on one side of the two aluminium foils and then dried in the same manner as in Example 1. The same high density polyethylene sheet as in Example 1 was placed between the coated surfaces of the two aluminium foils, followed by the same hot pressing as in Example 1. The bonded mass had a peel strength of 10.1 kg/2.5 cm width.

EXAMPLE 83

A solution was prepared from substantially the same mixture as in Example 68, excepting that maleic anhydride, crotonic acid and diallyl phthalate mixed in the same proportions as in Example 68 had a total amount of 10.0 parts by weight. The solution thus prepared was uniformly coated on one side of the two aluminium foils and then dried in the same manner as in Example 1. The same high density polyethylene sheet as in Example 1 was placed between the coated surfaces of the two aluminium foils, followed by the same hot pressing as in Example 1. The bonded mass had a peel strength of 14.2 kg/2.5 cm width.

EXAMPLE 84

A solution was prepared from substantially the same mixture as in Example 68, excepting that maleic anhydride, crotonic acid and diallyl phthalate mixed in the same proportions as in Example 68 had a total amount of 30.0 parts by weight. The solution thus prepared was uniformly coated on one side of the two aluminium foils and then dried in the same manner as in Example 1. The same high density polyethylene sheet as in Example 1 was placed between the coated surfaces of the two luminium foils, followed by the same hot pressing as in Example 1. The bonded mass had a peel strength of 12.6 kg/2.5 cm width.

EXAMPLES 85 to 88

Solutions were prepared from substantially the same mixture as in Example 68, excepting that the dicumyl peroxide used in Example 68 was replaced by the organic peroxides shown in Table 9 below. The solution thus prepared was uniformly coated on one side of the two aluminium foils and then dried in the same manner as in Example 1. The same high density polyethylene sheet as in Example 1 was placed between the coated surfaces of the respective aluminium foils, followed by the same hot pressing as in Example 1. The bonded masses had peel strengths set forth in Table 9 below.

Table 9

| Example | Organic peroxides | Peel strength of bonded masses (kg/2.5 cm width) |
| --- | --- | --- |
| 85 | 1,1-bis-tert-butyl-peroxy-3,3,5-trimethyl cyclohexane | 11.5 |
| 86 | 2,5-dimethylhexane-2,5-dihydroperoxide | 10.3 |
| 87 | Benzoyl peroxide | 12.2 |
| 88 | 2,5-dimethyl-2,5-dibenzoyl peroxyhexane | 9.9 |

EXAMPLE 89

100 parts by weight of the ethylene-vinyl acetate copolymer of Example 42 containing 33% by weight of vinyl acetate, 5 parts by weight of diallyl phthalate, 2 parts by weight of itaconic anhydride, 5 parts by weight of crotonic acid, and 1.0 part by weight of tert-butyl peroxybenzoate were dissolved in about 1000 parts by weight of a solvent consisting of about 750 parts by weight of toluene and about 250 parts by weight of ethyl acetate. The solution thus prepared was uniformly coated on one side of a 0.03 mm thick copper foil degreased in advance by trichloroethylene. After the solution was air dried overnight, a 0.5 mm thick sheet of soft vinyl chloride resin having an average polymerization degree of about 1000 and containing 50 parts by weight of dioctyl phthalate as a plasticizer based on 100 parts by weight of the vinyl chloride resin (manufactured by Japan Zeon Company under a trade name "Zeon 103 EP-J") was placed on the coated surface of said copper foil, followed by hot pressing for 2 minutes at a temperature of 180°C and pressure of 10 kg/cm$^2$ using a hot press. The bonded mass had a peel strength of 12.2 kg/2.5 cm width.

EXAMPLE 90

100 parts by weight of the ethylene-vinyl acetate copolymer of Example 30 containing 20% by weight of vinyl acetate, 2 parts by weight of diallyl phthalate, 0.4 part by weight of citraconic anhydride, 0.4 part by weight of crotonic acid, and 0.5 part by weight of benzoyl peroxide were dissolved in about 1000 parts by weight of xylene. The solution thus prepared was uniformly coated on one side of a 1 mm thick plate of stainless steel (SUS 27) degreased in advance by trichloroethylene. After the solution was dried for 5 minutes at 150°C, another stainless steel plate was superposed on the coated surface of the first mentioned stainless steel plate, followed by hot pressing for 5 minutes at a temperature of 160°C and pressure of 30 kg/cm$^2$. The bonded mass had a shear strength of 85 kg/cm$^2$.

EXAMPLE 91

A homogeneous solution was prepared with stirring from 10 parts by weight of the ethylene-vinyl acetate copolymer of Example 38 containing 28% by weight of vinyl acetate, 70 parts by weight of diallyl phthalate, 20 parts by weight of maleic anhydride, 10 parts by weight of crotonic acid, and 2.0 parts by weight of dicumyl peroxide. The solution thus prepared was uniformly coated on one side of the two aluminium foils used in Example 1. The same high density polyethylene sheet as in Example 1 was placed between the coated surfaces of the two aluminum foils, followed by the same hot pressing as in Example 1. The bonded mass had a peel strength of 11.9 kg/2.5 cm width.

EXAMPLE 92

The solution of the mixture of Example 68 was uniformly coated on one side of the two aluminium foils and then dried in the same manner as in Example 1. A sheet of kraft paper was placed between the coated surfaces of the two aluminium foils, followed by the same hot pressing as in Example 1. Though it was tried to measure the peel strength of the bonded mass, the kraft paper was torn due to its firm bonding with the aluminium foils, preventing the accurate measurement of the peel strength.

What we claim is:

1. An adhesive resin composition comprising:
   A. 1 to 99 parts by weight of ethylene-vinyl acetate copolymer containing 5 to 50% by weight of vinyl acetate,
   B. 99 to 1 parts by weight of a mixture comprising 1 to 99 mol % of unsaturated dicarboxylic anhydride selected from the group consisting of maleic anhydride, itaconic anhydride, citraconic anhydride and α-methyl glutaconic anhydride and
   99 to 1 mol % ester of carboxylic acid selected from the group consisting of acrylic and methacrylic acid esters of alkoxy monoalcohols, glycols, triols and tetraols; 2-methylene glutarate acid esters of alkanols or allyl alcohol; itaconic acid esters of alkanols or allyl alcohol; alkyl allyl esters of phthalic acid and diallyl phthalate.

2. A resin composition according to claim 1, wherein the ester of carboxylic acid is selected from the group consisting of methoxypolyethylene glycol acrylate, methoxypolyethylene glycol methacrylate, ethoxypolyethylene glycol acrylate, ethoxypolyethylene glycol methacrylate, ethylene glycol diacrylate, ethylene glycol dimethacrylate, polyethylene glycol diacrylate, polyethylene glycol dimethacrylate, propylene glycol diacrylate, propylene glycol dimethacrylate, polypropylene glycol diacrylate, polypropylene glycol dimethacrylate, 1,3-butylene glycol diacrylate, 1,3-butylene glycol dimethacrylate, neopentyl glycol diacrylate, neopentyl glycol dimethacrylate, trimethyloethane triacrylate, trimethyloethane trimethacrylate, trimethylolpropane triacrylate, trimethylolpropane trimethyacrylate, tetramethylolmethane tetraacrylate, hydroxyethyl methacrylate, hydroxyethyl acrylate, hydroxypropyl methacrylate, hydroxypropyl acrylate, polyethylene glycol monomethacrylate, polyethylene glycol monoacrylate, trimethyloethane monomethacrylate, trimethyloethane monoacrylate, trimethyloethane dimethacrylate, trimethyloethane diacrylate, pentaerythritol dimethacrylate, pentaerythritol diacrylate, pentaerythritol trimethacrylate, pentaerythritol triacrylate, dimethyl-2-methylene glutarate, diethyl-2-methyleneglytarate, dibutyl-2-methylene glutarate, diallyl-2-methylene glutarate, monomethyl-2-methylene glutarate, monoethyl-2-methylene glutarate, diethyl itaconate, dibutyl itaconate, monobutyl itaconate, and methyl butyl itaconate.

3. The resin composition of claim 1 which contains 70 to 98 parts by weight of component (A) for each 30 to 2 parts of component (B).

4. The resin composition of claim 1 which comprises 5 to 80 mol % of crotonic acid.

5. A resin composition according to claim 4, wherein the ester of carboxylic acid is selected from the group consisting of methoxypolyethylene glycol acrylate, methoxypolyethylene glycol methacrylate, ethoxypolyethylene glycol acrylate, ethoxypolyethylene glycol methacrylate, ethylene glycol diacrylate, ethylene glycol dimethacrylate, polyethylene glycol diacrylate, polyethylene glycol dimethacrylate, propylene glycol diacrylate, propylene glycol dimethacrylate, polypropylene glycol diacrylate, polypropylene glycol dimethacrylate, 1,3-butylene glycol diacrylate, 1,3-butylene glycol dimethacrylate, neopentyl glycol diacrylate, neopentyl glycol dimethacrylate, trimethylolethane triacrylate, trimethylolethane trimethacrylate, trimethylolpropane triacrylate, trimethylolpropane trimethacrylate, tetramethylolmethane tetraacrylate, hydroxyethyl methacrylate, hydroxyethyl acrylate, hydroxypropyl methacrylate, hydroxypropyl acrylate, polyethylene glycol monomethacrylate, polyethylene glycol monoacrylate, trimethylolethane monomethacrylate, trimethylolethane monoacrylate, trimethylolethane dimethacrylate, trimethylolethane diacrylate, pentaerythritol dimethacrylate, pentaerythritol diacrylate, pentaerythritol trimethacrylate, pentaerythritol triacrylate, dimethyl-2-methylene glutarate, diethyl-2-methylene glutarate, dibutyl-2-methylene glutarate, diallyl-2-methylene glutarate, monomethyl-2-methylene glutarate, monoethyl-2-methylene glutarate, diethyl itaconate, dibutyl itaconate, monobutyl itaconate, and methyl butyl itaconate.

6. The resin composition of claim 1 which contains up to 5 parts by weight of organic peroxide per 100 parts by weight of the resin composition.

7. The resin composition of claim 6 wherein said organic peroxide is dialkyl peroxide, diacyl peroxide, ketone peroxide, hydroperoxide or peroxy ester having a decomposition temperature above 60°C.

8. The resin composition of claim 7 which contains 0.1 to 3 parts by weight of said peroxide per 100 parts by weight of the resin composition.

9. A resin composition according to claim 6, wherein the ester of carboxylic acid is selected from the group consisting of methoxypolyethylene glycol acrylate, methoxypolyethylene glycol methacrylate, ethoxypolyethylene glycol acrylate, ethoxpolyethylene glycol methacrylate, ethylene glycol diacrylate, ethylene glycol dimethacrylate, polyethylene glycol diacrylate, polyethylene glycol dimethacrylate, propylene glycol diacrylate, propylene glycol dimethacrylate, polypropylene glycol diacrylate, polypropylene glycol dimethacrylate, 1,3-butylene glycol diacrylate, 1,3-butylene glycol dimethacrylate, neopentyl glycol diacrylate, neopentyl glycol dimethacrylate, trimethylolethane triacrylate, trimethylolethane trimethacrylate, trimethylolpropane triacrylate, trimethylolpropane trimethylacrylate, tetramethylolmethane tetraacrylate, hydroxyethyl methacrylate, hydroxyethyl acrylate, hydroxypropyl methacrylate, hydroxypropyl acrylate, polyethylene glycol monomethacrylate, polyethylene glycol monoacrylate, trimethylolethane monomethacrylate, trimethylolethane monoacrylate, trimethylolethane dimethacrylate, trimethylolethane diacrylate, pentaerythritol dimethacrylate, pentaerythritol diacrylate, pentaerythritol trimethacrylate, pentaerythritol triacrylate, dimethyl-2-methylene glutarate, diethyl-2-methylene glutarate, dibutyl-2-methylene glutarate, diallyl-2-methylene glutarate, monomethyl-2-methylene glutarate, monoethyl-2-methylene glutarate, diethyl itaconate, dibutyl itaconate, monobutyl itaconate, and methyl butyl itaconate.

10. The resin composition of claim 1 which comprises up to 2 mols of an alcoholic compound selected from the group consisting of monhydric and polyhydric alcohols per mol of said unsaturated dicarboxylic anhydride.

11. The resin composition of claim 10 wherein said alcoholic compound is octyl alcohol, cetyl alcohol, ethylene glycol, diethylene glycol, polyethylene glycol, propylene glycol, polypropylene glycol, glycerine or pentaerythritol in an amount between about 0.3 to 1.5 mols per mol of said anhydride.

12. A resin composition according to claim 10, wherein the ester of carboxylic acid is selected from the group consisting of methoxypolyethylene glycol acrylate, methoxypolyethylene glycol methacrylate, ethoxypolyethylene glycol acrylate, ethoxypolyethylene glycol methacrylate, ethylene glycol diacrylate, ethylene glycol dimethacrylate, polyethylene glycol diacrylate, polyethylene glycol dimethacrylate, propylene glycol diacrylate, propylene glycol dimethacrylate, polypropylene glycol diacrylate, polypropylene glycol dimethacrylate, 1,3-butylene glycol diacrylate, 1,3-butylene glycol dimethacrylate, neopentyl glycol diacrylate, neopentyl glycol dimethacrylate, trimethylolethane triacrylate, trimethylolethane trimethylacrylate, trimethylolpropane triacrylate, trimethylolpropane trimethacrylate, tetramethylolmethane tetraacrylate, hydroxyethyl methacrylate, hydroxyethyl acrylate, hydroxypropyl methacrylate, hydroxypropyl acrylate, polyethylene glycol monomethacrylate, polyethylene glycol monoacrylate, trimethylolethane monomethacrylate, trimethylolethane monoacrylate, trimethylolethane dimethacrylate, trimethylolethane diacrylate, pentaerythritol dimethacrylate, pentaerythritol diacrylate, pentaerythritol trimethacrylate, pentaerythritol triacrylate, dimethyl-2-methylene glutarate, diethyl-2-methylene glutarate, dibutyl-2-methylene glutarate, diallyl-2-methylene glutarate, monomethyl-2-methylene glutarate, monoethyl-2-methylene glutarate, diethyl itaconate, dibutyl itaconate, monobutyl itaconate, and methyl butyl itaconate.

* * * * *